United States Patent
Ishii

(10) Patent No.: US 9,706,103 B2
(45) Date of Patent: Jul. 11, 2017

(54) FOCUS CONTROL APPARATUS AND CONTROL METHOD THEREFOR

(71) Applicant: CANON KABUSHIKI KAISHA, Tokyo (JP)

(72) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 14/526,315

(22) Filed: Oct. 28, 2014

(65) Prior Publication Data
US 2015/0124158 A1    May 7, 2015

(30) Foreign Application Priority Data

Nov. 1, 2013 (JP) .................................. 2013-228319
Nov. 1, 2013 (JP) .................................. 2013-228320

(51) Int. Cl.
*H04N 5/232* (2006.01)
*G03B 13/36* (2006.01)
*H04N 5/369* (2011.01)

(52) U.S. Cl.
CPC ......... *H04N 5/23212* (2013.01); *G03B 13/36* (2013.01)

(58) Field of Classification Search
CPC .. H04N 5/23212; H04N 9/045; H04N 5/3696; G03B 13/36; G03B 13/00; G02B 7/34
See application file for complete search history.

(56) References Cited

U.S. PATENT DOCUMENTS

| 5,995,144 A | 11/1999 | Sasakura | |
|---|---|---|---|
| 8,610,784 B2 * | 12/2013 | Terashima | G02B 7/365 348/208.12 |
| 2002/0021897 A1 * | 2/2002 | Nakata | G02B 7/34 396/123 |
| 2004/0189857 A1 * | 9/2004 | Hirai | H04N 5/23212 348/345 |
| 2006/0018650 A1 | 1/2006 | Ichimiya | |
| 2006/0104623 A1 * | 5/2006 | Sasaki | H04N 5/23212 396/121 |
| 2007/0122137 A1 * | 5/2007 | Ohnishi | G03B 13/34 396/123 |

(Continued)

FOREIGN PATENT DOCUMENTS

CN  101320193 A  12/2008
CN  102262333 A  11/2011

(Continued)

*Primary Examiner* — Roberto Velez
*Assistant Examiner* — Tuan Le
(74) *Attorney, Agent, or Firm* — Canon USA Inc., IP Division

(57) ABSTRACT

An acquisition unit is configured to acquire first defocus information based on a sensor output corresponding to a first region in an area of a captured image, and to acquire second defocus information based on a sensor output corresponding to a second region in the area. A control unit is configured to obtain defocus information corresponding to the area using the first defocus information and the second defocus information, and to perform focus control based on the obtained defocus information. The first region has a length longer in a phase-difference detection direction than the length of the second region.

23 Claims, 12 Drawing Sheets

(56) References Cited

U.S. PATENT DOCUMENTS

| | | |
|---|---|---|
| 2007/0206940 A1 | 9/2007 | Kusaka |
| 2009/0148147 A1* | 6/2009 | Fujii .................... G03B 13/32 396/128 |
| 2009/0185798 A1* | 7/2009 | Tsukada ................ G02B 7/34 396/123 |
| 2010/0245656 A1 | 9/2010 | Fujii et al. |
| 2011/0052173 A1* | 3/2011 | Yoshida ................ G03B 7/00 396/213 |
| 2011/0273608 A1 | 11/2011 | Tsukada |
| 2012/0242886 A1 | 9/2012 | Kawarada |
| 2014/0016021 A1* | 1/2014 | Uchida ................ G03B 13/36 348/353 |
| 2014/0043522 A1* | 2/2014 | Hamano ............ H04N 5/23219 348/349 |
| 2014/0055646 A1* | 2/2014 | Kobayashi ............ H04N 5/367 348/246 |
| 2015/0055011 A1* | 2/2015 | Aoki .................... G02B 7/34 348/353 |

FOREIGN PATENT DOCUMENTS

| | | |
|---|---|---|
| CN | 104272161 A | 1/2015 |
| EP | 0961148 A2 | 12/1999 |
| EP | 1887399 A1 | 2/2008 |
| JP | H09-054242 A | 2/1997 |
| JP | 2001-004914 A | 1/2001 |
| JP | 2001-083407 A | 3/2001 |
| RU | 2458401 C2 | 8/2012 |
| RU | 2474850 C1 | 2/2013 |
| SU | 1377811 A1 | 2/1988 |

* cited by examiner

FIG. 2A

| R | Gr | R | Gr | R | Gr | R | Gr | R | Gr |
|---|----|---|----|---|----|---|----|---|----|
| Gb | B | Gb | B | Gb | B | Gb | B | Gb | B |

FIG. 2B

| R A | R B | Gr A | Gr B | R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B | Gb A | Gb B | B A | B B |

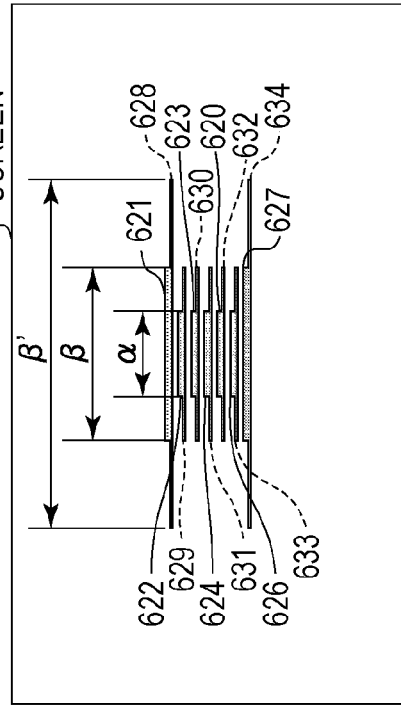
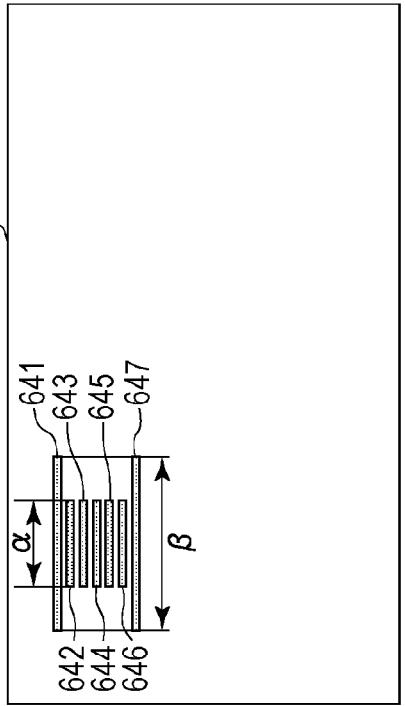
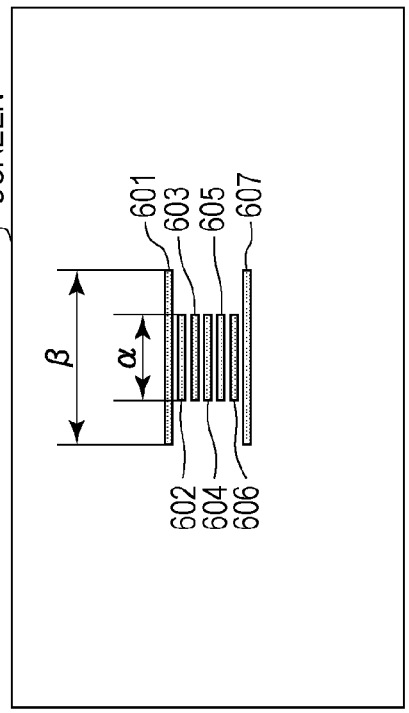
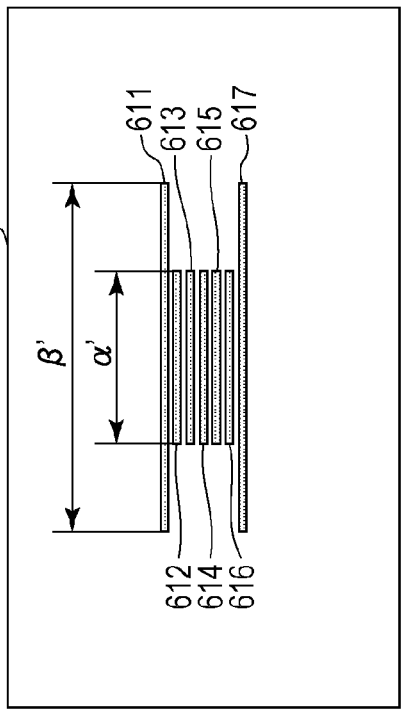

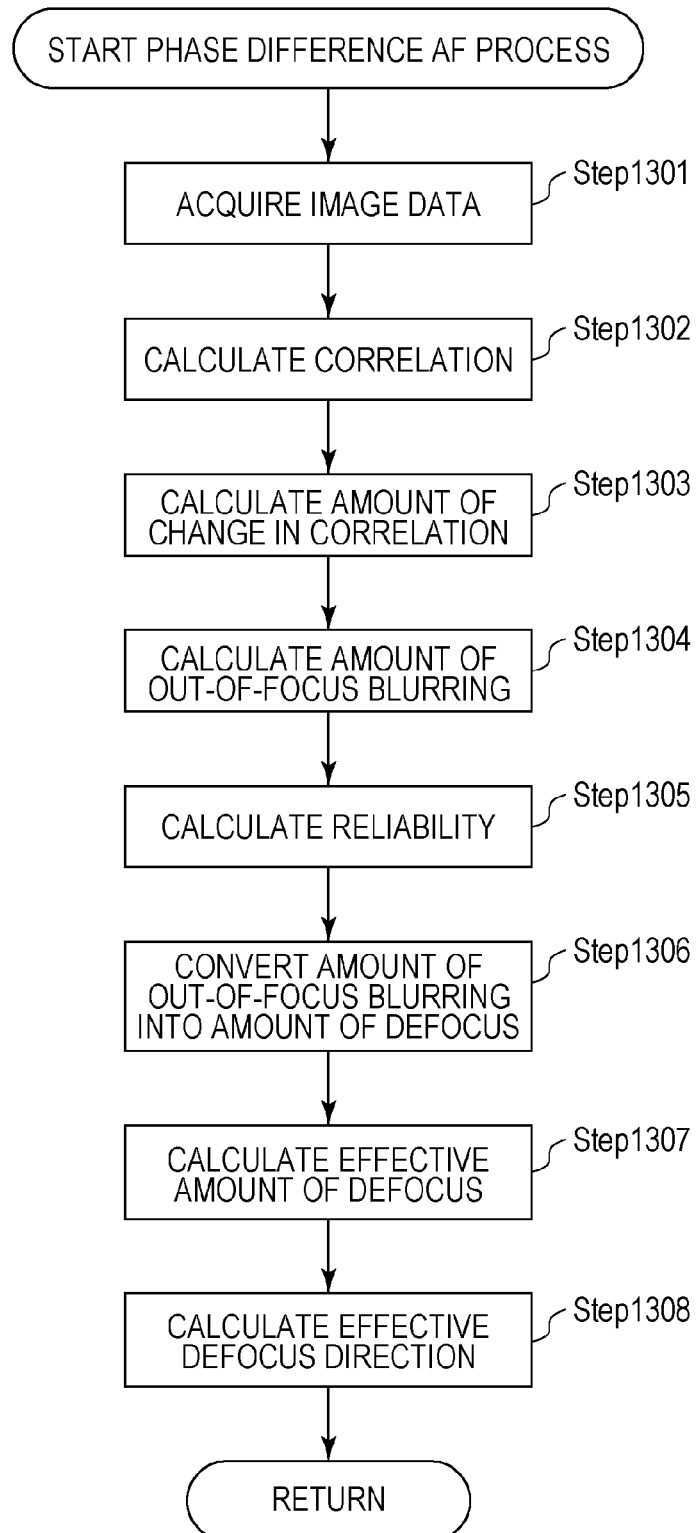

FOCUS CONTROL APPARATUS AND CONTROL METHOD THEREFOR

BACKGROUND OF THE INVENTION

Field of the Invention

The present invention relates to focus control for imaging devices and the like.

Description of the Related Art

Examples of methods for controlling the focus of an imaging device include a phase-difference detection method and a contrast detection method (see Japanese Patent Laid-Open No. 09-054242 and Japanese Patent Laid-Open No. 2001-004914). There is also available an image-plane phase-difference detection method that also takes into account shooting in a Live View (LV) mode, which allows a user to capture images while looking at the images on a rear monitor or the like (see Japanese Patent Laid-Open No. 2001-083407).

In the image-plane phase-difference detection method, which also supports the Live View mode, however, a need still exists for more stable focus control than ever to make the method suitable for shooting in the Live View mode and for movie shooting. In particular, with an increase in pixel count, inadvertent focus transitions would result in the production of moving images that are unnatural for observers.

SUMMARY OF THE INVENTION

In an aspect, a focus control apparatus for detecting a phase difference between two images to acquire defocus information includes an acquiring unit which acquires first defocus information based on an output of an image sensor corresponding to a first region in an area of a captured image, and acquires second defocus information based on an output of the image sensor corresponding to a second region in the area, and a control unit which obtains defocus information corresponding to the area using the first defocus information and the second defocus information, and performs focus control based on the obtained defocus information. The first region has a length longer in a phase-difference detection direction than the length of the second region.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIGS. 2A and 2B are diagrams illustrating a region that is part of an image sensor, in which FIG. 2A illustrates a pixel configuration with an example Bayer pattern and FIG. 2B illustrates a pixel configuration used for the image-plane phase-difference AF method.

FIGS. 6A to 6D are diagrams illustrating example layouts of a detection area where an amount of defocus is detected.

FIG. 10 is a flowchart of a phase difference AF process.

DESCRIPTION OF THE EMBODIMENTS

An embodiment of the present invention will be described hereinafter with reference to the drawings. The following embodiment is an example or implementation of the present invention, and may be modified or changed in accordance with the configuration of a device or an apparatus to which the present invention is applied and various conditions. The scope of the present invention is not limited to the following embodiment.

Configuration of Imaging Device

A description will be given of an imaging device as an example of a focus control apparatus according to an embodiment of the present invention. In this embodiment, a description will be given of an imaging device configured such that a lens device is removably attachable to the imaging device. Instead, any other type of imaging device such as a lens-equipped digital camera may be used.

Figure 1:
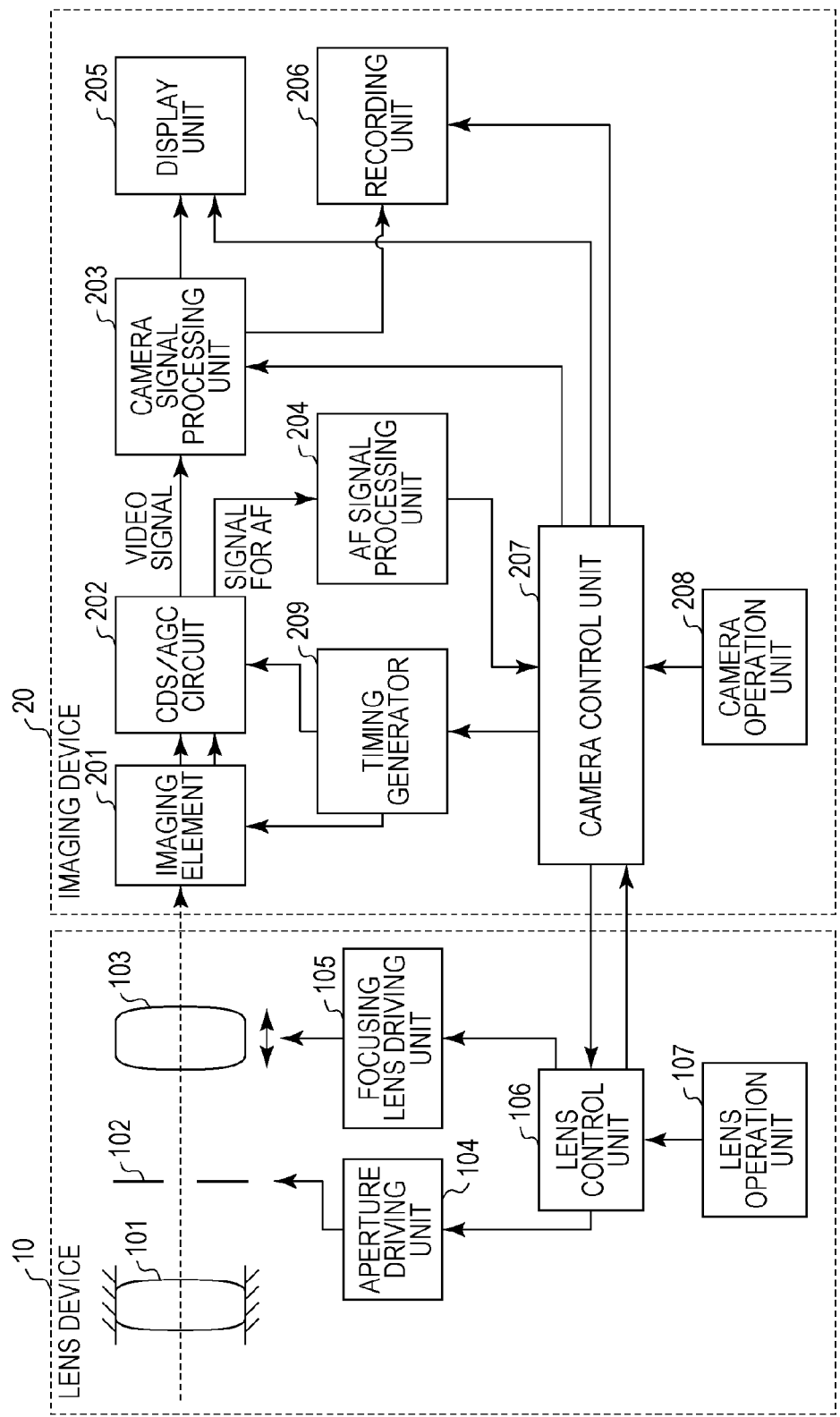
FIG. 1 is a block diagram illustrating the configuration of an imaging device serving as a focus control apparatus and the configuration of a lens device.

FIG. 1 is a block diagram illustrating the configuration of the main part of a lens device and an imaging device according to this embodiment.

As illustrated in FIG. 1, this embodiment is implemented by a lens device 10 and an imaging device 20. A lens control unit 106 that controls the overall operation of the lens device 10, and a camera control unit 207 that controls the overall operation of the imaging device 20 communicate information to each other.

First, a description will be given of the configuration of the lens device 10. The lens device 10 includes a fixed lens unit 101 having a group of fixed lenses, an aperture 102, a focusing lens 103, an aperture driving unit 104, a focusing lens driving unit 105, the lens control unit 106, and a lens operation unit 107. The fixed lens unit 101, the aperture 102, and the focusing lens 103 form an imaging optical system.

The aperture 102 is driven by the aperture driving unit 104 to control the amount of light incident on an imaging element 201 described below. The focusing lens 103 is driven by the focusing lens driving unit 105 to adjust the focus on an image formed on the imaging element 201 described below. The aperture driving unit 104 and the focusing lens driving unit 105 are controlled by the lens control unit 106 to determine the opening of the aperture 102 and the position of the focusing lens 103. In response to a user operation with the lens operation unit 107, the lens control unit 106 performs control corresponding to the user operation. The lens control unit 106 controls the aperture driving unit 104 and the focusing lens driving unit 105 in accordance with control instructions/control information received from the camera control unit 207 described below, and transmits lens control information to the camera control unit 207.

Next, a description will be given of the configuration of the imaging device 20. The imaging device 20 is configured to acquire an image capture signal from light flux transmitted through the imaging optical system of the lens device 10. The imaging device 20 includes the imaging element 201, a correlated double sampling/automatic gain control (CDS/AGC) circuit 202, a camera signal processing unit 203, an autofocus (AF) signal processing unit 204, a display unit 205, a recording unit 206, the camera control unit 207, a camera operation unit 208, and a timing generator 209. The imaging element 201 is a member serving as an image sensor, and is composed of a charge-coupled device (CCD) sensor, a complementary metal-oxide semiconductor (CMOS) sensor, or the like. The light flux transmitted through the imaging optical system of the lens device 10 is focused on a light receiving surface of the imaging element 201, and is converted into signal charge corresponding to an amount of incident light by photodiodes. Signal charges accumulated in the respective photodiodes are sequentially read from the imaging element 201 as voltage signals corresponding to the signal charges in response to driving pulses given by the timing generator 209, in accordance with the instructions of the camera control unit 207.

A video signal and a signal for AF which are read from the imaging element 201 are input to the CDS/AGC circuit 202 for sampling and gain adjustment. The CDS/AGC circuit 202 outputs the video signal to the camera signal processing unit 203, and the signal for AF (signal for image-plane phase-difference AF) to the AF signal processing unit 204.

The camera signal processing unit 203 performs various image processing operations on the signal output from the CDS/AGC circuit 202 to generate a video signal.

The display unit 205, examples of which include a liquid crystal display (LCD), displays the video signal output from the camera signal processing unit 203 as a captured image.

The recording unit 206 records the video signal from the camera signal processing unit 203 onto a recording medium such as a magnetic tape, an optical disc, or a semiconductor memory.

The AF signal processing unit 204 performs correlation computation based on two image signals for AF, which are output from the CDS/AGC circuit 202, and calculates an amount of defocus and reliability information (such as image similarity, two-image steepness, contrast information, saturation information, and defect information). The calculated amount of defocus and reliability information are output to the camera control unit 207. The camera control unit 207 notifies the AF signal processing unit 204 of any changing of the settings for calculating the amount of defocus and the reliability information, on the basis of the acquired amount of defocus and reliability information. The details of the correlation computation will be described below with reference to FIGS. 7A to 7D, 8A, 8B, 9A, and 9B.

The camera control unit 207 communicates information to the other internal components of the imaging device 20 to perform control. The camera control unit 207 executes internal processing of the imaging device 20, and also implements various camera functions based on user operations in accordance with input from the camera operation unit 208. Examples of the camera functions include turning on and off power, changing the settings, starting recording, starting AF control, and checking recorded video clips. In addition, as described above, the camera control unit 207 communicates information to the lens control unit 106 in the lens device 10 to send control instructions/control information for the lens device 10, and to acquire information on the internal components of the lens device 10.

Image Sensor

FIGS. 2A and 2B illustrate part of the light receiving surface of the imaging element 201 serving as an image sensor. In order to enable image-plane phase-difference AF, the imaging element 201 has an array of pixel units each having two photodiodes serving as photoelectric converters per micro lens. The photodiodes are light receiving units. This enables each pixel unit to receive split portions of the light flux passing through the exit pupil of the lens device 10.

FIG. 2A is a schematic diagram of part of an image sensor surface having an example Bayer pattern of red (R), blue (B), and green (Gb, Gr), the designations of which are for reference purposes only. FIG. 2B illustrates an example pixel unit having two photodiodes serving as photoelectric converters per micro lens, which are arranged in correspondence with the color filter pattern illustrated in FIG. 2A.

An image sensor having the configuration described above is configured to output two signals for phase difference AF (hereinafter also referred to as an A image signal and a B image signal) from each pixel unit. The image sensor is also configured to output signals (the A image signals+the B image signals) for recording a captured image, each of which is obtained by the sum of signals of two photodiodes. In the case of the sum signals, signals equivalent to the output of the image sensor having the example Bayer pattern schematically described with reference to FIG. 2A are output.

Using the output signals from the imaging element 201 serving as the image sensor described above, the AF signal processing unit 204, described below, performs correlation computation of two image signals, and calculates information such as an amount of defocus and various types of reliability.

In this embodiment, a signal for image capture and two signals for phase difference AF, that is, three signals in total, are output from the imaging element 201. However, the present invention is not limited to this method. For example, a signal for image capture and one of two image signals for phase difference AF, that is, two signals in total, may be output from the imaging element 201. In this case, after the signals are output, the other one of the two image signals for phase difference AF is calculated using the two signals output from the imaging element 201.

In FIGS. 2A and 2B, by way of example, pixel units each having two photodiodes serving as photoelectric converters per micro lens are arranged in an array. Instead of this configuration, pixel units each having three or more photodiodes serving as photoelectric converters per micro lens may be arranged in an array. Alternatively, a plurality of pixel units each having light receiving units having different opening positions for each micro lens may be used. In other words, it may be sufficient to obtain, as a result, two signals for phase difference AF which provide the phase-difference detection capabilities, such as an A image signal and a B image signal.

AF Control Process

Next, a description will be given of an AF control process executed by the camera control unit 207.

Figure 3:
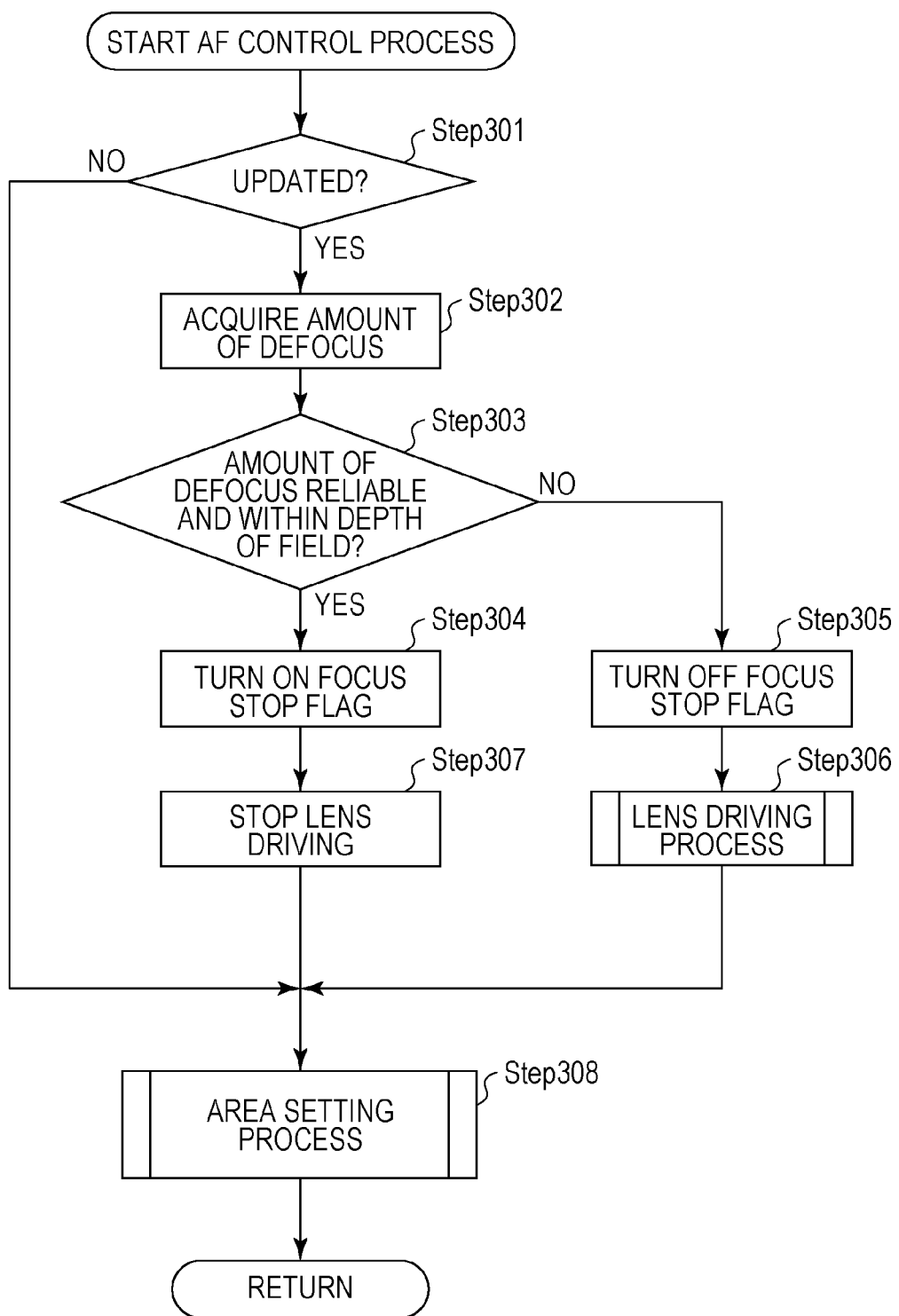
FIG. 3 is a flowchart illustrating an autofocus (AF) control process.

FIG. 3 is a flowchart illustrating an AF control process executed by the camera control unit 207 illustrated in FIG. 1. The illustrated process is executed in accordance with a computer program stored in the camera control unit 207. This process is executed, for example, in a cycle in which an image capture signal is read from the imaging element 201 (or every vertical synchronization period) in order to generate a one-field image (hereinafter also referred to as one frame or one screen). Instead, this process may be repeatedly performed a plurality of times within a vertical synchronization period (V rate).

In FIG. 3, first, the camera control unit 207 checks whether the AF signal has been updated in the AF signal processing unit 204 (Step 301). If the AF signal has been updated, the camera control unit 207 acquires the result from the AF signal processing unit 204 (Step 302).

Then, the camera control unit 207 determines whether or not the acquired amount of defocus, which indicates the amount of out-of-focus blurring, is within a predetermined depth of field and is reliable, that is, the reliability of the amount of defocus is higher than a predetermined value (Step 303). If the amount of defocus is within the depth of field and the reliability of the amount of defocus is higher than the predetermined value, the camera control unit 207 turns on a focus stop flag (Step 304), or, otherwise, the camera control unit 207 turns off the focus stop flag (Step 305). When the focus stop flag is on, the focus has been controlled so that the focusing lens 103 is moved to an in-focus position, and focus control is to be stopped.

The reliability of the amount of defocus will now be discussed. If the accuracy of the calculated amount of defocus is reliable, it is determined that the reliability is high. If a defocus direction indicating a direction in which an in-focus position will be present is reliable, it is determined that the reliability is "medium". The reliability of the amount of defocus is high when, for example, the contrast between the A image signal and the B image signal is high and the A image signal and the B image signal have similar shapes (i.e., high image similarity) or when the main subject image is in focus. In this case, the driving operation is performed using the amount of defocus, which is considered reliable.

The reliability of the amount of defocus is "medium" when the image similarity calculated by the AF signal processing unit 204 is lower than a predetermined value, but the correlation obtained by relatively shifting the A image signal and the B image signal has certain tendency and the defocus direction is reliable. This determination result is often obtained when, for example, a main subject image is blurred a small amount. Furthermore, when the amount of defocus and the defocus direction are not reliable, it is determined that the reliability is low. For example, when the contrast between the A image signal and the B image signal is low and the image similarity between the A image signal and the B image signal is also low, it is determined that the reliability is low. This determination result is often obtained when a subject image is blurred a large amount, in which case it is difficult to calculate the amount of defocus.

If the amount of defocus is within the predetermined depth of field and the reliability of the amount of defocus is high, the camera control unit 207 stops driving the focusing lens 103 to control the focus (Step 307). Then, the process proceeds to Step 308.

If the focus stop flag is turned off (Step 305), the camera control unit 207 performs setting for lens driving described below (Step 306), and performs an area setting process (Step 308). Then, the process ends.

Lens Driving Process

Figure 4:
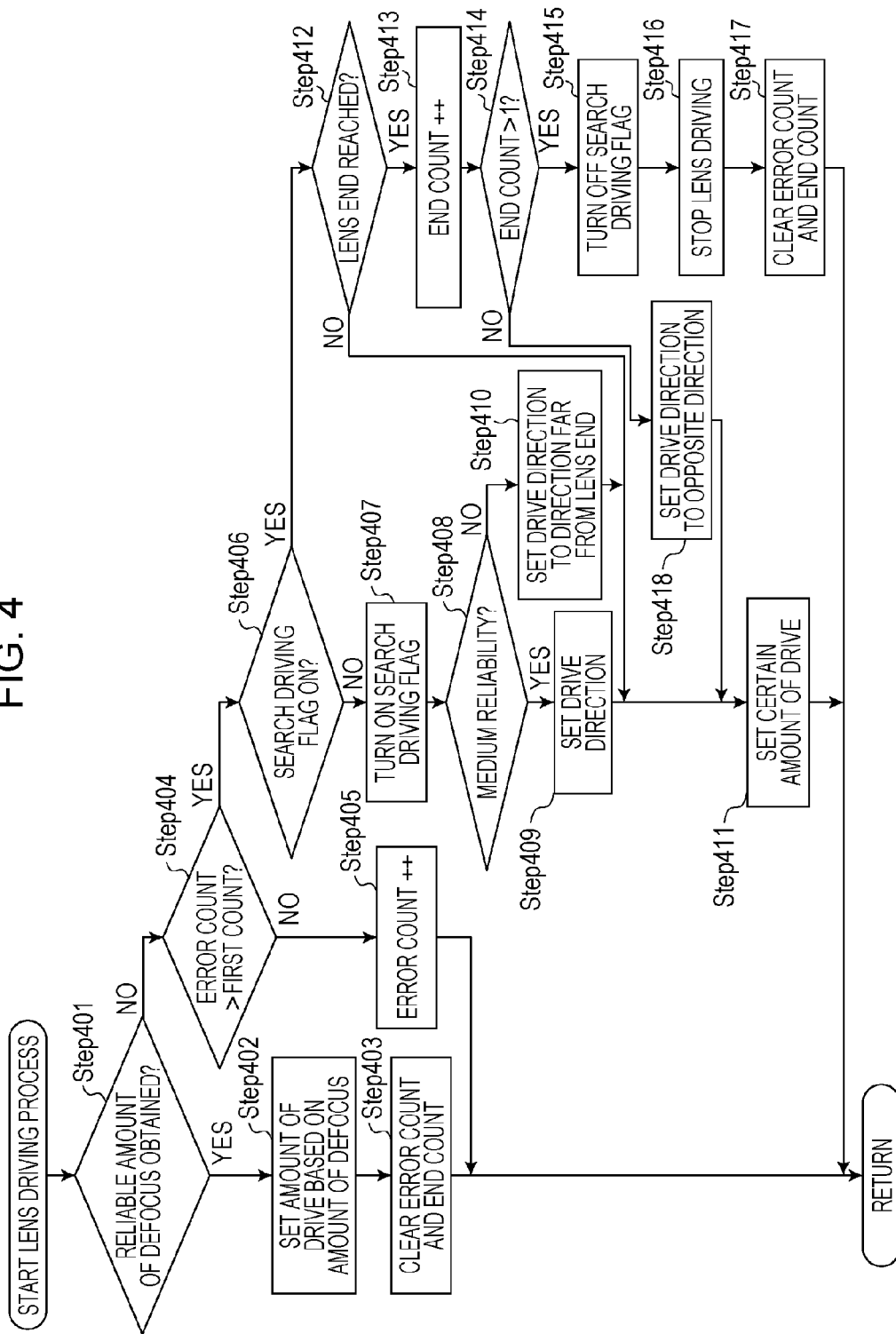
FIG. 4 is a flowchart illustrating a lens driving process.

FIG. 4 is a flow diagram illustrating the details of the AF control process in FIG. 3 (Step 306).

First, in Step 401, the camera control unit 207 determines whether an amount of defocus has been obtained and the reliability of the amount of defocus is high. If an amount of defocus has been obtained and the reliability of the amount of defocus is high (YES in Step 401), the camera control unit 207 determines an amount of drive and a drive direction on the basis of the amount of defocus (Step 402).

Then, the camera control unit 207 clears the error count and the end count (Step 403), and then ends the process. If an amount of defocus has not been obtained or the reliability of the amount of defocus is not high (NO in Step 401), the camera control unit 207 determines whether the error count exceeds a first count (Step 404). The first count may be a predetermined value (not illustrated) stored in a non-volatile memory in advance. For example, the first count may be twice or more as large as a second count described below.

If the error count is not larger than the first count (NO in Step 404), the camera control unit 207 increments the error count (Step 405), and then ends the process. If the error count is larger than the first count (YES in Step 404), the camera control unit 207 determines whether a search driving flag is ON (Step 406).

If it is determined in Step 406 that the search driving flag is off (NO in Step 406), the search operation has not yet been started or search is not in progress. Thus, the camera control unit 207 turns on the search driving flag (Step 407), and determines whether or not the reliability of the amount of defocus is "medium" (Step 408).

If the reliability is "medium", the camera control unit 207 sets a drive direction using the defocus direction (Step 409), and sets a certain amount of drive (Step 411). In this case, the camera control unit 207 performs search driving to drive the focusing lens 103 a predetermined amount in the obtained defocus direction, instead of driving the focusing lens 103 on the basis of the absolute value of the amount of defocus.

If the reliability is not "medium" (NO in Step 408), the camera control unit 207 sets a drive direction to a direction far from the lens end (Step 410), and then sets a certain amount of drive (Step 411).

The certain amount of drive in Step 411 may be a value determined in a non-volatile memory in advance. For example, the amount of drive may be set to correspond to a distance that is several times the depth of focus. The amount of drive may also be variable in accordance with the focal length. For example, the amount of drive may be set to increase as the focal length increases. In this case, the search driving direction is, for example, a direction of the far lens end with respect to the current focus position.

If the search driving flag is on (YES in Step 406), search driving has already been started. Thus, the camera control unit 207 continuously executes the previous focus control. Then, the camera control unit 207 determines whether the focusing lens 103 is at the lens end, which is a lens driving limit in focus control (Step 412), If the focusing lens 103 is at the lens end (YES in Step 412), the camera control unit 207 increments the end count (Step 413).

If the end count exceeds a predetermined value (YES in Step 414), a reliable amount of defocus has not been obtained even by moving the focusing lens 103 from the close-up position to the infinity position. Thus, the camera control unit 207 determines that there is no object that can be focused. Then, the camera control unit 207 turns off the search driving flag (Step 415), and stops lens driving (Step 416). Furthermore, the camera control unit 207 clears the error count and the end count (Step 417), and then ends the process.

If the end count does not exceed the predetermined value (NO in Step 414), the camera control unit 207 sets the lens drive direction for focus control to a drive direction opposite to the current drive direction (Step 418), and then sets a certain amount of drive (Step 411).

Area Setting Process

Figure 5:
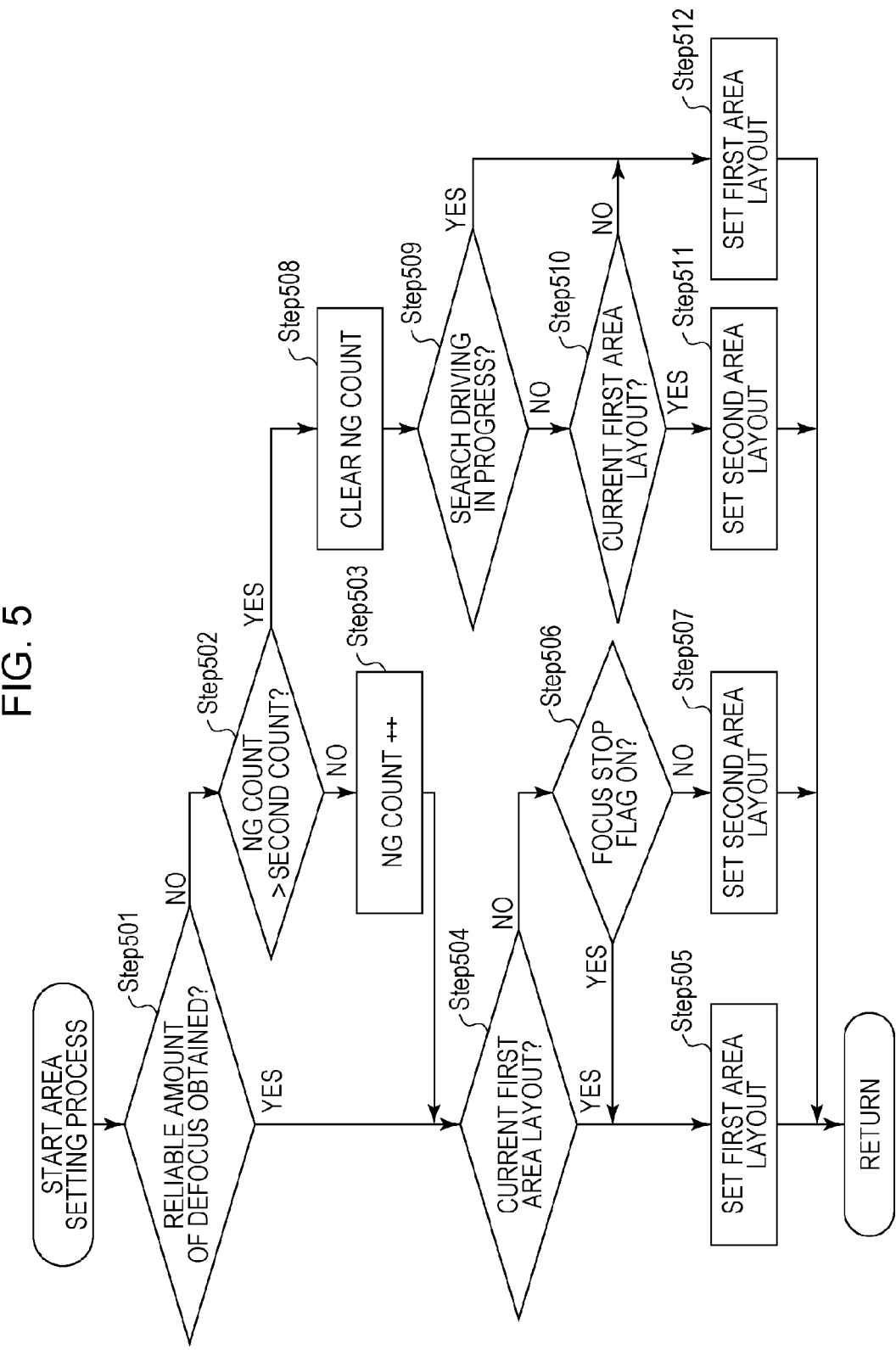
FIG. 5 is a flowchart illustrating a process for setting a detection area where an amount of defocus is detected.

FIG. 5 is a flow diagram illustrating the details of the area setting process in FIG. 3 (Step 308).

First, the camera control unit 207 determines whether an amount of defocus has been obtained and the reliability of the amount of defocus is high (Step 501). If an amount of defocus has been obtained and the reliability of the amount of defocus is high (YES in Step 501), the camera control unit 207 determines whether or not an area layout currently set in a captured image is a first area layout (Step 504). If the current area layout is the first area layout (YES in Step 504), the camera control unit 207 maintains the setting of the first area. If the current area layout is not the first area layout (NO in Step 504), in Step 506, the camera control unit 207 determines whether a focus stop flag is ON. If the focus stop flag is ON (YES in Step 506), the camera control unit 207 sets the first area layout (Step 505). Accordingly, a comparatively narrow area layout is set after focus is achieved. If the focus stop flag is OFF (NO in Step 506), the camera control unit 207 sets a second area layout that is larger than the first area layout (Step 507). Accordingly, the setting may be changed.

Here, the first area layout is set when the focus stop flag is ON (Step 506), because the subject image to be captured in the second area layout might be different from the subject image to be captured in the first area. To address this situation, when lens driving for focus control is stopped because focus is achieved in the second area layout due to the focus stop flag being ON, the second area layout is changed to the comparatively small first area layout. The transition to the first area layout takes into account movie shooting in which a main subject often appears at the center of the screen. The setting of the comparatively small first area layout may increase the probability that the intended subject image will finally be in focus.

When the comparatively small first area layout is set, the amount of defocus for a subject may not necessarily be detectable. Thus, if information that is largely different from the previous information concerning the amount of defocus for the comparatively large second area layout is obtained when the second area layout is changed to the comparatively small first area layout, the second area layout may be set again.

If an amount of defocus has not been obtained or the reliability of the amount of defocus is not high (NO in Step 501), the camera control unit 207 determines whether or not the NG count exceeds a second count (Step 502). If the NG count does not exceed the second count (NO in Step 502), the camera control unit 207 increments the NG count (Step 503). Then, the camera control unit 207 determines whether or not the current area layout is the first area layout (Step 504).

If the NG count exceeds the second count (YES in Step 502), the camera control unit 207 clears the NG count (Step 508), and determines whether or not search driving is in progress (Step 509). If search driving is in progress (YES in Step 509), the camera control unit 207 sets the first area layout (Step 512). If search driving is not in progress (NO in Step 509), the camera control unit 207 determines whether the current area layout is the first area layout (Step 510). If the current area layout is the first area layout (YES in Step 510), the camera control unit 207 sets the comparatively large second area layout (Step 511). If the current area layout is not the first area layout (NO in Step 510), the camera control unit 207 sets the comparatively small first area layout (Step 512).

The reason that it is determined whether search driving is in progress (Step 509) is as follows. The operation of switching between the first area layout and the second area layout is performed before search driving is executed, thereby ensuring that search driving is performed in the case of NG for both areas before search driving is performed.

In addition, if a reliable amount of defocus has been acquired during search driving, the camera control unit 207 stops search driving and performs focus control in accordance with the acquired result. Accordingly, during search driving, a subject image that is not appropriate might be captured in the relatively large second area, and therefore the first area layout is set.

Area Layout (1)

Area layouts will be described in more detail with reference to FIGS. 6A to 6D. FIG. 6A is a diagram illustrating the first area layout. The area has seven regions, namely, regions 601 to 607. The regions 601 and 607 have a second length that is β% of the horizontal length of the screen. Five regions having a first length that is α% of the horizontal length of the screen and shorter than the second length, namely, the regions 602 to 606, are arranged in the center of the image capture screen. In this manner, a plurality of regions having different lengths are arranged in an area, and the number of short regions is larger than the number of long regions.

The amounts of defocus obtained from the seven regions are used in combination to acquire one effective amount of defocus and one effective defocus direction described below. Focus control is performed to drive a lens to focus using the effective amount of defocus and the effective defocus direction. In the following, a concept that means one amount of defocus corresponding to an area is also referred to as an effective amount of defocus. In addition, a concept that means one defocus direction corresponding to an area is also referred to as an effective defocus direction.

Arranging regions having the comparatively short first length and regions having the comparatively long second length ensures image quality in movie shooting and Live View shooting. Only a set of regions having the comparatively short first length might be insufficient to capture a main subject image or might cause a moving main subject to fail to appear in an area. Accordingly, focus might blur due to the output of the image sensor corresponding to the regions having the comparatively short first length. To address such focus blurring, regions having the comparatively long second length are arranged in the area, making it possible to maintain a main subject image while captured. In the example illustrated in FIG. 6A described above, the number of short regions is larger than the number of long regions. The relationship of both may be reversed. An arrangement of regions having different lengths in an area may provide certain advantages. However, as illustrated by way of example, regions having different lengths are arranged so that the number of comparatively short regions, the proportion of which in the image capture screen is low, is larger than the number of long regions, more likely avoiding appearance of near and far objects in the screen, and enabling the lens to be focused on an image of the user-intended subject. In the example illustrated in FIG. 6A described above, the regions having the comparatively long second length are arranged outside of the regions having the comparatively short first length. Arranging the regions having the comparatively long second length within the regions having the comparatively short first length will provide certain advantages. However, as illustrated in FIG. 6A, arranging the regions having the comparatively long second length outside of the regions having the comparatively short first length may provide the following advantage. That is, the advantage takes into account movie shooting in which the user-intended main subject appears at a comparative center of the screen. The short regions occupying the center portion of the area may bring the center of a subject image captured in the area into focus. This advantage takes into account that movie images and Live View images include scenes of moving objects. Thus, consideration is given that the user often takes photographs so that a main subject intended to be in focus is located at the center of the image capture screen so as not to disappear from the image capture screen. In the first area layout illustrated in FIG. 6A, when the area is located at the center of the screen, the number of regions having the same length as a region located at the center of the screen is larger than the number of other regions. Instead, when the area is located at the center of the screen, the number of regions having the same length as a region located at the center of the screen may be smaller than the number of other regions, providing certain advantages. However, as described previously, considering movie shooting in which the main subject is often positioned at the center of the screen, when the area is located at the center of the screen, the number of regions having the same length as a region located at the center of the screen is larger than the number of other regions. The size of a region located at the center of the image capture screen is determined so that the lens can be focused on an image of the user-intended subject, and in addition, the number of regions having the same size as this region is set to be the largest. Furthermore, even if a temporarily targeted subject disappears from the regions having the comparatively short first length, the subject may be captured in the regions having the comparatively long second length. Accordingly, stable focus control may be achieved.

As a comprehensive effect, focus control stability may be markedly increased.

FIG. 6B is a diagram illustrating the second area layout. The second area layout is larger than the first area layout illustrated in FIG. 6A. Two regions (611 and 617) having a comparatively long fourth length that is β'% of the horizontal length of the image capture screen, and five regions (612 to 616) having a comparatively short third length that is α'% of the horizontal length of the image capture screen are arranged. In FIGS. 6A to 6D, by way of example, the second length is twice as long as the first length and is equal to the third length, and the fourth length is twice as long as the third length. Note that the magnification factors are merely illustrative and do not constitute limitations of the present invention. However, such illustrative magnification relationships may provide more simple circuit design or program configuration.

The reason that the comparatively large second area layout is provided in addition to the comparatively small first area layout will be described with reference to FIGS. 12A to 12C.

Figure 12A:
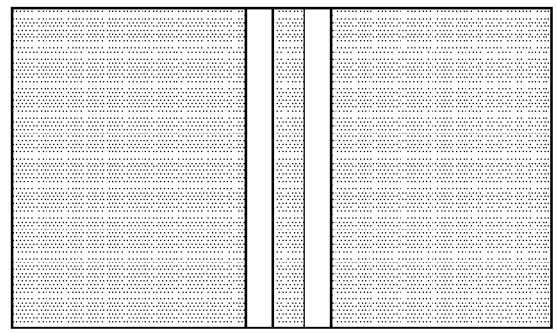
FIGS. 12A to 12C are diagrams illustrating example image signals in an image-plane phase-difference detection method.
Figure 12B:
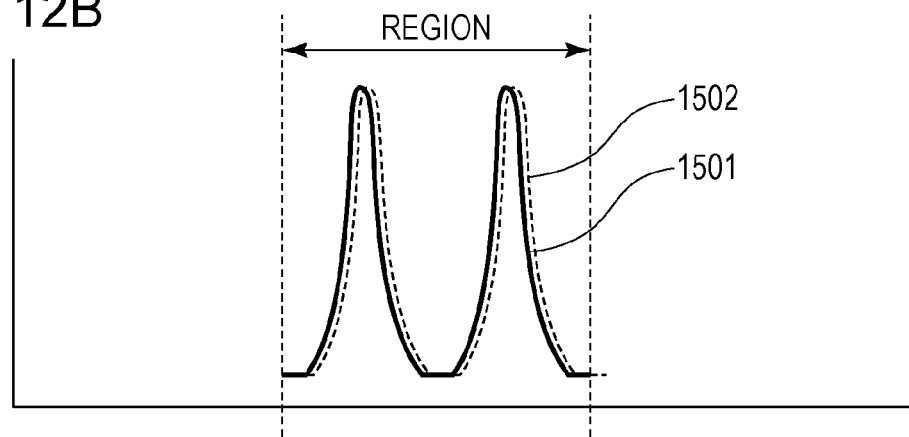
Figure 12C:
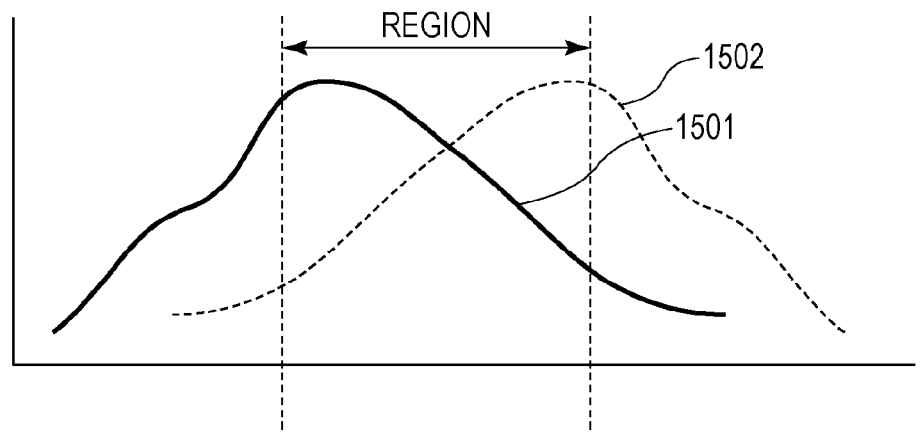

For example, a subject image illustrated in FIG. 12A is captured. In this case, when the subject image is nearly in focus, images having a shape of two peaks appear in an area (FIG. 12B). Here, for example, the images are labeled an A image 1501 and a B image 1502, and the deviation between the two images is calculated using a phase-difference detection method to calculate an amount of defocus. However, if the subject image is largely blurred (the subject image has a large amount of blurring), the shape of the two peaks is deformed, resulting in a shape of a single peak being obtained. In addition, the peak has valleys spread out. In other words, the shape of the subject image to be captured may differ largely depending on the state of focus (i.e., either a largely blurred state or a nearly-in-focus state) (FIG. 12C).

Thus, in a largely blurred state where an amount of defocus might not be obtained, the setting of the relatively large second area layout may increase focusing stability. That is, the provision of the relatively large second area may increase the frequency with which an amount of defocus and a defocus direction are obtained.

Area Layout (2)

In FIGS. 6A and 6B, attention is directed to a horizontal length. The technique disclosed herein may also be applied to the arrangement of regions in the vertical direction (in a grain direction that is parallel to the short edge of the screen).

Furthermore, the area setting process in FIG. 5 has been described by way of example in the context of the flow of switching between the first area layout illustrated in FIG. 6A and the second area layout illustrated in FIG. 6B. Alternatively, as long as the computational circuit size or the program size permits, for example, as illustrated in FIG. 6C, areas, the proportions of which in the image capture screen are given, may be arranged in advance so as to include both the first area and the second area, and may be selected and used. That is, as illustrated in FIG. 6C, regions 621 to 634 are arranged in an area, where the regions 601 to 607 illustrated in FIG. 6A correspond to the regions 621 to 627 illustrated in FIG. 6C and the regions 611 to 617 illustrated in FIG. 6B correspond to the region areas 628 to 634 illustrated in FIG. 6C. Accordingly, the regions 621 to 627 are selected and used for the first area layout described with reference to FIG. 5, and the areas 628 to 634 are selected and used for the second area layout described with reference to FIG. 5.

In the foregoing description, the first area and/or the second area are arranged at the center of the image capture screen. Taking into account composition before shooting, a fourth area layout that takes into account a scene in which the subject image that the user or photographer wishes to capture is not located at the center of the image capture screen may be used (FIG. 6D). The fourth area layout is also applicable to situations (not illustrated) where an image detected using a function for identifying a predetermined subject image, such as a face detection function, is to be brought into focus and where a desired subject on the image capture screen is to come into focus in accordance with instructions given by a user through a touch operation or the like. The camera control unit 207 sets the area layout described above at a position that is not at the center of the screen, such as the position of regions 641 to 647 illustrated in FIG. 6D, or makes the area layout movable and sets the area layout at a position where a face has been detected or at a position specified by the user.

In this manner, increased flexibility of various area layouts is well suited for the image-plane phase-difference AF method.

Correlation Computation

Next, a description will be given of the calculation of the effective amount of defocus described above, by way of example. Correlation computation, a correlation waveform, and the like as correlation information will be described first, and then the calculation of the effective amount of defocus will be described.

Figure 7A:
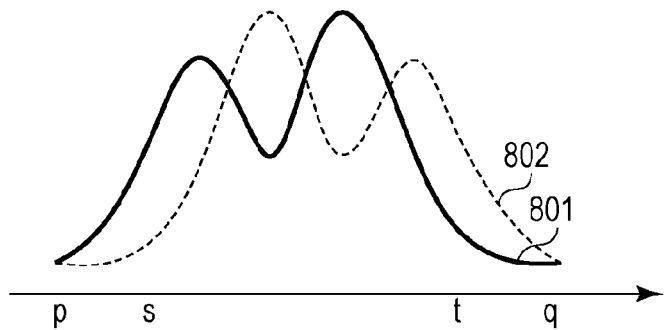
FIGS. 7A to 7D are diagrams illustrating image signals obtained from a detection area where an amount of defocus is detected.
Figure 7B:
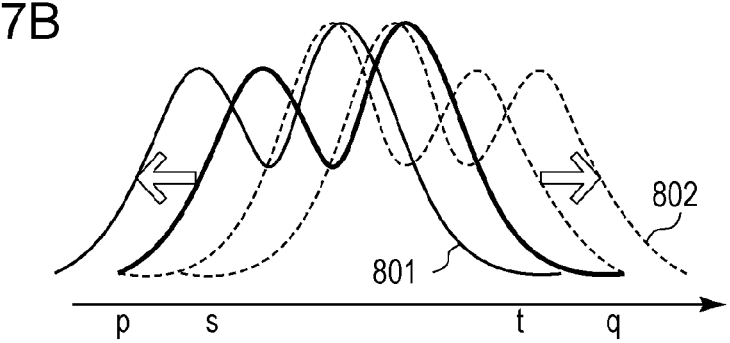
Figure 7C:
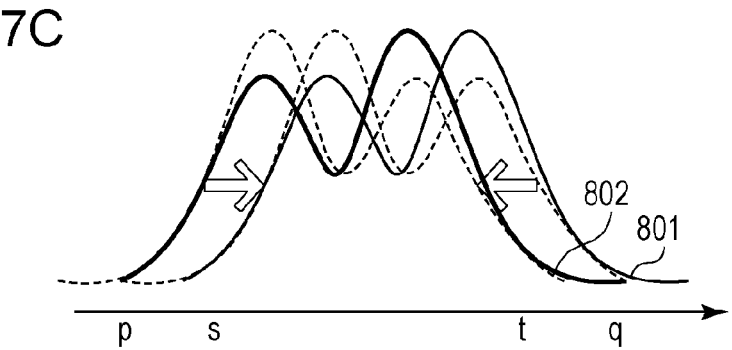
Figure 7D:
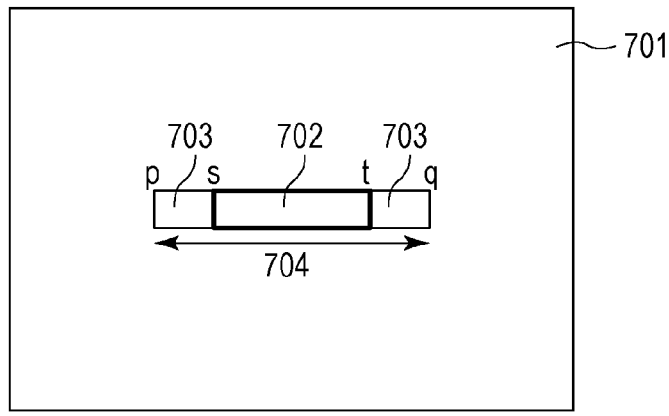

FIG. 7D is a conceptual diagram of regions where image signals are acquired, by way of example, on a pixel array of the imaging element 201 serving as an image sensor. In a pixel array 701 on which pixel units (not illustrated) are arranged in an array, a region 702 is a region to be subjected to computation described below. The region 702 and shift regions 703 used for correlation computation when the amount of defocus for the region 702 is calculated are combined to produce a shift region 704. The shift region 704 is used for correlation computation.

In FIGS. 7A to 7D, 8A, 8B, 9A, and 9B, p, q, s, and t represent coordinates in the x-axis direction, where the shift region 704 is bordered by p to q, and the region 702 is bordered by s to t.

FIGS. 7A, 7B, and 7C depict image signals acquired from the shift region 704 set in FIG. 7D. The range defined by s to t represents an image signal corresponding to the region 702, and the range defined by p to q represents an image signal corresponding to the shift region 704 in a range used for computation for calculating an amount of defocus based on an amount of shift. FIG. 7A is a diagram conceptually depicting waveforms of the A image signal and the B image signal that have not been shifted for correlation computation. A solid line 801 represents the A image signal, and a broken line 802 represents the B image signal. FIG. 7B is a conceptual diagram of waveforms obtained by shifting the image waveforms depicted in FIG. 7A, which have not been shifted, to the positive direction, and FIG. 7C is a conceptual diagram of waveforms obtained by shifting the image waveforms depicted in FIG. 7A, which have not been shifted, to the negative direction. Correlation, that is the degree of correlation between two images, may be calculated by, for example, shifting the A image signal 801 and the B image signal 802 by 1 bit in the respective directions of arrows.

Next, a description will be given of a calculation method of a correlation COR. First, as depicted in FIGS. 7B and 7C, for example, the A image signal and the B image signal are shifted by 1 bit, and the sum of the absolute values of the differences between the A image signal and the B image signal in the individual states is calculated. In this case, the amount of shift is represented by i, with a minimum shift of p-s in FIG. 8A and a maximum shift of q-t in FIG. 8A. In addition, x denotes the start coordinate of a distance measurement region, and y denotes the end coordinate of the distance measurement region. Using the above values, the sum of the absolute values of the differences between the A image signal and the B image signal can be calculated in accordance with Expression (1) below.

$$COR[i] = \sum_{k=x}^{y} |A[k+i] - B[k-i]|\{(p-s) < i < (q-t)\} \quad (1)$$

Figure 8A:
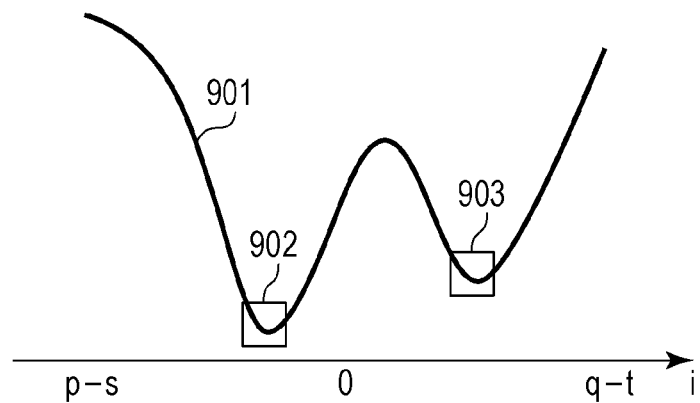
FIGS. 8A and 8B are diagrams illustrating a correlation waveform, an amount-of-change-in-correlation waveform, and an amount of out-of-focus blurring.

FIG. 8A is a conceptual diagram illustrating the correlation as a graph of a waveform. In the graph, the abscissa represents the amount of shift, and the ordinate represents the correlation. A correlation waveform 901 has nearly extreme values 902 and 903. In the illustrated graph, the smaller the correlation, the higher the similarity between the A image and the B image.

Next, a description will be given of a calculation method of an amount of change in correlation ΔCOR. First, referring to the conceptual diagram of the correlation waveform in FIG. 8A, an amount of change in correlation is calculated using, for example, a difference between correlations for every other shift. In this case, the amount of shift is represented by i, with a minimum shift of p-s in FIG. 8A and a maximum shift of q-t in FIG. 8A. Using the above values, an amount of change in correlation can be calculated in accordance with Expression (2) below.

$$\Delta COR[i]=COR[i-1]-COR[i+1]\{(p-s+1)<i<(q-t-1)\} \quad (2)$$

Figure 8B:
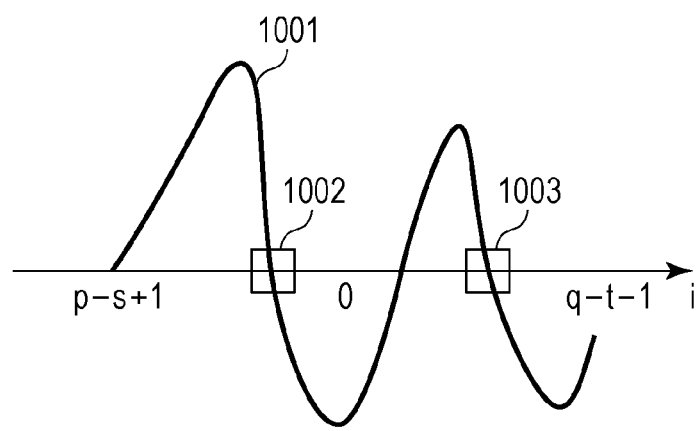

FIG. 8B is a conceptual diagram illustrating the amount of change in correlation ΔCOR as a graph of a waveform. In the graph, the abscissa represents the amount of shift, and the ordinate represents the amount of change in correlation. An amount-of-change-in-correlation waveform 1001 has points 1002 and 1003 at which the amount of change in correlation changes from positive to negative. The amount of change in correlation that becomes 0 from the point 1002 is an amount of shift between the A image signal and the B image signal with relatively high similarity between the A image and the B image. At this time, the amount of shift corresponds to the amount of defocus.

Figure 9A:
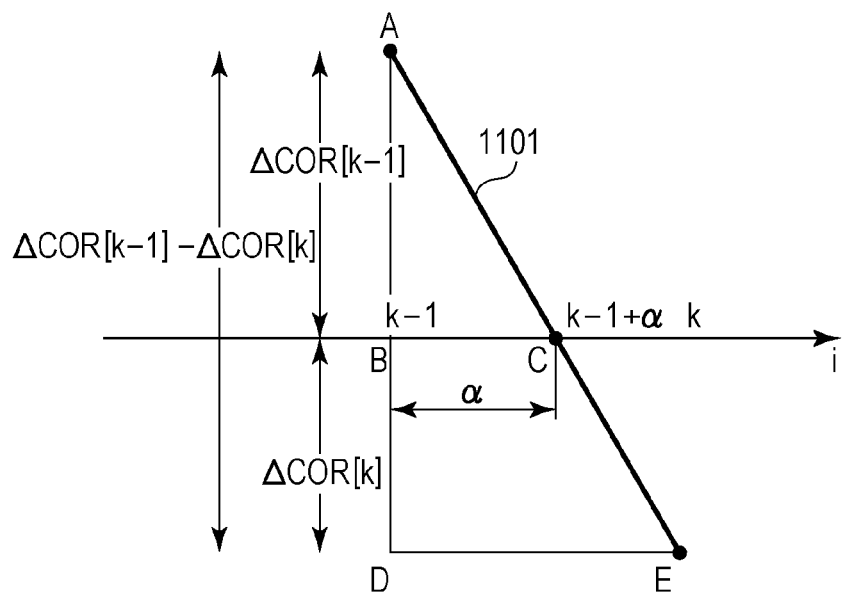
FIGS. 9A and 9B are diagrams illustrating a method for calculating an image similarity.

FIG. 9A is an enlarged view of the point 1002 in FIG. 8B, and a waveform that is part of the amount-of-change-in-correlation waveform 1001 is represented by a waveform 1101. A calculation method of an amount of out-of-focus blurring PRD corresponding to an amount of defocus will be described by way of example with reference to FIG. 9A. An amount of out-of-focus blurring is conceptualized as an integer part β and a fractional part α. The fractional part α can be calculated using the similarity relationship between a triangle ABC and a triangle ADE in FIG. 9A in accordance with Expression (3) below.

$$AB: AD = BC: DE \quad (3)$$
$$\Delta COR[k-1]: \Delta COR[k-1] - \Delta COR[k] = \alpha: k - (k-1)$$
$$\alpha = \frac{\Delta COR[k-1]}{\Delta COR[k-1] - \Delta COR[k]}$$

Then, referring to FIG. 9A, the integer part β can be calculated using Expression (4) below.

$$\beta = k - 1 \quad (4)$$

Accordingly, the amount of out-of-focus blurring PRD can be calculated using the sum of α and β.

As illustrated in FIG. 8B, when there are a plurality of zero-crossing points, a zero-crossing point with a high steepness max der of the change in correlation (hereinafter referred to as the steepness) is represented by a first zero-crossing point. Steepness is a measure of how easy AF is. The larger the value of steepness, the easier AF is. The steepness can be calculated in accordance with Expression (5) below.

$$\max der=|\Delta COR[k-1]|+|\Delta COR[k]| \quad (5)$$

As described above, when there are a plurality of zero-crossing points, the first zero-crossing point is determined using steepness.

Figure 9B:
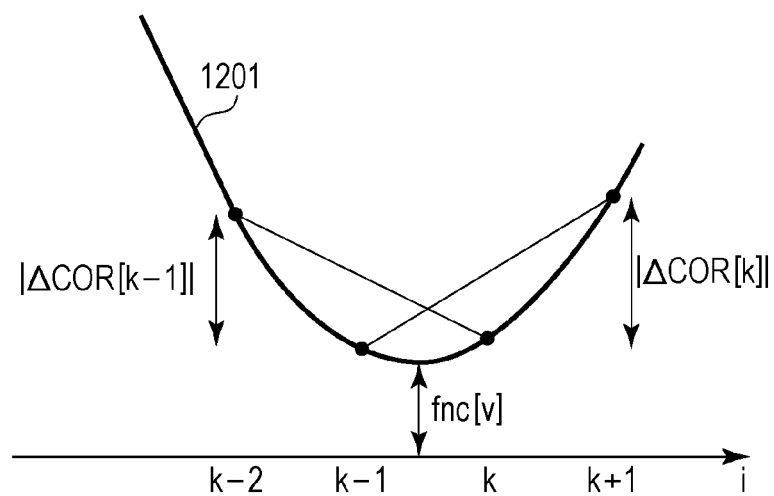

Next, a description will be given of a calculation method of the reliability of the amount of out-of-focus blurring, by way of example. The reliability of the amount of out-of-focus blurring corresponds to the reliability of the amount of defocus. The following description is illustrative, and any other well-established method may be used to calculate the reliability. Reliability may be defined by the steepness described above and the image similarity fnclvl between the A image signal and the B image signal (hereinafter referred to the image similarity). Image similarity is a measure of accuracy of an amount of out-of-focus blurring. The smaller the value of image similarity, the higher the accuracy. FIG. 9B is an enlarged view of the nearly extreme value 902 in FIG. 8A, and illustrates a waveform 1201 that is part of the correlation waveform 901. A calculation method of steepness and image similarity will now be described. The image similarity can be calculated in accordance with Expression (6) below.

(i) When $|\Delta COR[k-1]| \times 2 \leq \max\_der$, fnclvl=COR$[k-1]+\Delta COR[k-1]/4$ (ii) When $|\Delta COR[k-1]| \times 2 > \max\_der$, fnclvl=COR$[k]-\Delta COR[k]/4$ \hspace{1em} (6)

Accordingly, the image similarity is calculated.

Calculation of Amount of Defocus

FIG. 10 is a flow diagram of a process up to calculation of an amount of defocus. In the following illustrative description, an amount of out-of-focus blurring and an amount of defocus are individually distinguished. In the technical idea disclosed herein, an amount of defocus may be conceptualized as an absolute distance from an in-focus position or as the number of pulses, or may be a concept different in dimension or unit from the above concept, or otherwise be a relative concept. An amount of defocus is a concept indicating how much a current position of the lens is shifted from the in-focus position or how much to perform focus control to bring the lens into the in-focus condition. The acquisition of defocus information as the above-described concept is described as the acquisition of focus information.

In Step 1301, an A image signal and a B image signal are acquired from a pixel at the position on the imaging element (i.e., image sensor) 201 corresponding to each region that is set in the manner described above by way of example. Then, a correlation is calculated from the acquired image signals (Step 1302). Then, an amount of change in correlation is calculated from the calculated correlation (Step 1303). Then, an amount of out-of-focus blurring is calculated from the calculated amount of change in correlation (Step 1304). In addition, reliability indicating how reliable the calculated amount of out-of-focus blurring is calculated (Step 1305). The processing operations described above are performed a number of times corresponding to the number of regions in the area.

Then, the amount of out-of-focus blurring is converted into the amount of defocus for each region in the area (Step 1306). Furthermore, an effective amount of defocus and an effective defocus direction are calculated (Step 1307 and Step 1308).

Calculation of Effective Amount of Defocus

Figure 11:
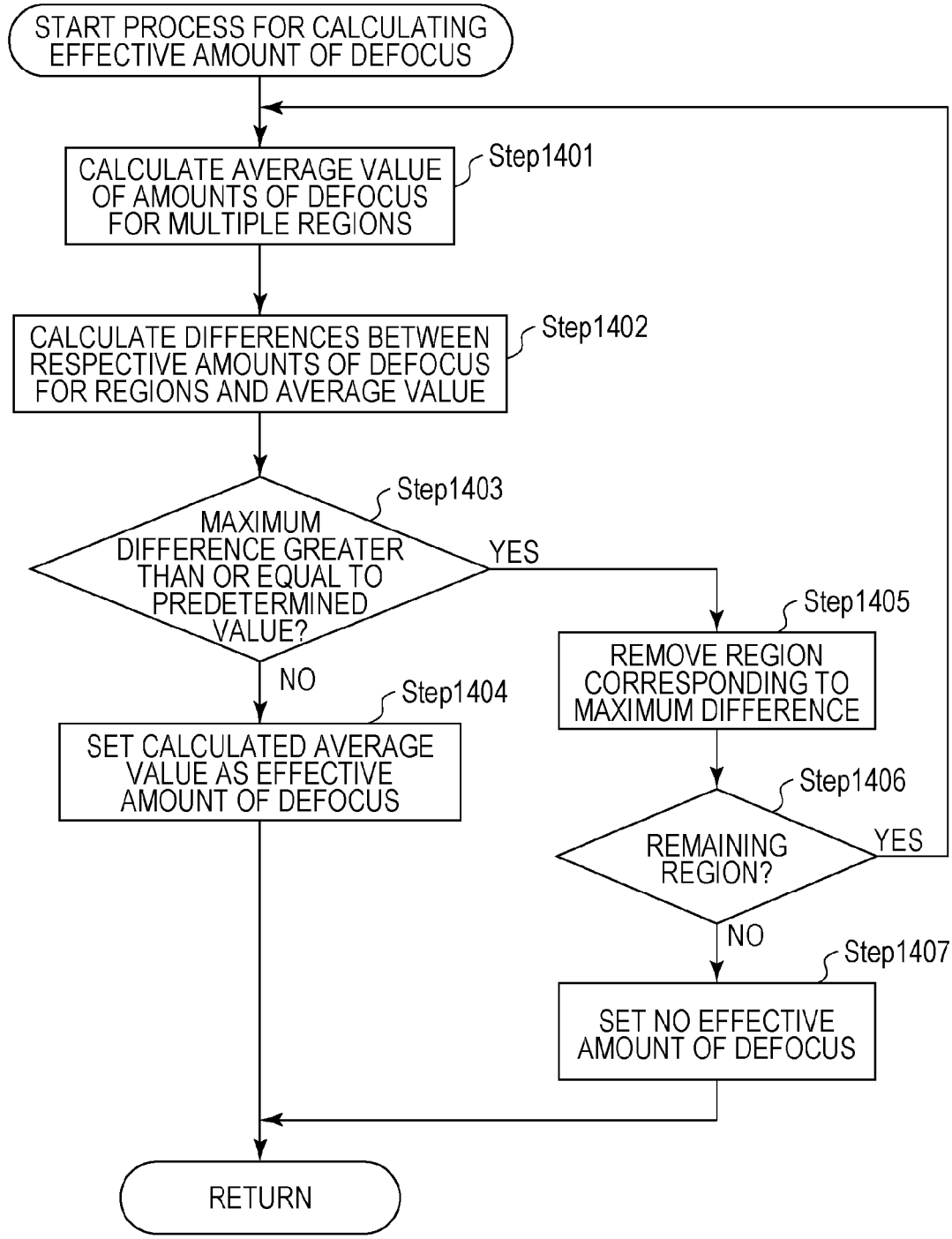
FIG. 11 is a flowchart of the calculation of an amount of defocus.

FIG. 11 is a flow diagram of a process for calculating an amount of defocus corresponding to an area as the effective amount of defocus illustrated in Step 1307 described above. The correlation computation performed by the AF signal processing unit 204 will be described with reference to FIGS. 7A to 10.

In the calculation of an effective amount of defocus, first, the AF signal processing unit 204 searches a plurality of regions in an area for a region for which the amount of defocus has been obtained and for which the reliability of the amount of defocus is high. As a result of search, an average value of amounts of defocus for regions that satisfy the conditions is calculated (Step 1401).

Then, the AF signal processing unit 204 calculates a difference between the amount of defocus for each region and the average value calculated in Step 1401 (Step 1402). Then, the AF signal processing unit 204 determines whether the maximum value of the calculated differences for the respective regions is greater than or equal to a predetermined value (Step 1403). That is, the AF signal processing unit 204 determines whether each of the respective amounts of defocus for the plurality of regions in the area is an amount of defocus with large deviation. If the maximum value of the calculated differences for the respective regions is less than the predetermined value (NO in Step 1403), the AF signal processing unit 204 sets the average value calculated in Step 1401 as the effective amount of defocus (Step 1404). Conversely, if the maximum value of the calculated differences for the respective regions is greater than or equal to the predetermined value (YES in Step 1403), the AF signal processing unit 204 removes the amount of defocus for the region corresponding to the maximum difference from the target from which an average value is calculated (Step 1405). In other words, an amount of defocus with large deviation among the respective amounts of defocus for the plurality of regions in the area is removed from the target of calculation.

The AF signal processing unit 204 determines whether there is any amount of defocus for a remaining region (Step 1406). If there is an amount of defocus for a remaining region (YES in Step 1406), the AF signal processing unit 204 returns to Step 1401, and repeatedly performs the process. If the current amount of defocus is that for the last region, that is, if there is no remaining amount of defocus (NO in Step 1406), the AF signal processing unit 204 determines that no effective amount of defocus has been obtained, and sets no effective amount of defocus (Step 1407). The effective defocus direction undergoes processing similar to that of the effective amount of defocus. Furthermore, in order to obtain an effective defocus direction, for example, a plurality of regions are searched for regions for which the amount of defocus has been obtained and the reliability of the amount of defocus is high or regions for which the reliability of the amount of defocus is "medium", and the direction that the largest number of regions among the regions have is set as the effective defocus direction.

In the example described above, by way of example, the amount of defocus for the regions corresponding to the maximum difference is removed as an amount of defocus with large deviation from the target from which an average value is calculated (Step 1405). Instead of removing an amount of defocus with large deviation from the target of calculation, assigning a small weighting to an amount of defocus with large deviation will also provide certain advantages. In this case, however, because of the weighting, a main subject image may be defocused.

In this manner, an amount of defocus with large deviation among the respective amounts of defocus for a plurality of regions in an area is not used for the following reason. Since an amount of defocus for an area is calculated using amounts of defocus for a plurality of regions, due to the size of the area, the risk of occurrence of appearance of near and far objects in the screen is relatively high.

Close-Up Priority

In FIG. 11, by way of example, an effective amount of defocus is calculated more preferentially in the close-up direction than in the far direction, because a subject image that the user or photographer wishes to be in focus is presumably located at the close-up position rather than in the background. In other words, the photographer often focuses the lens on a subject image located at the close-up position, and a subject image located at a close-up position is more likely to be a subject image intended by the photographer. Accordingly, for example, when a difference between the amount of defocus for a given region in an area and an average value for the area is calculated (Step 1402), the difference between the amount of defocus and the average value is multiplied by a value smaller than 1 if the amount of defocus is related to a defocus direction toward the close-up position. In an alternative example, the predetermined value in Step 1403 is increased. Accordingly, the amount of defocus related to a defocus direction toward the close-up position is relatively less likely to be equal to an amount of defocus for the maximum value among the calculated differences for the respective regions. This may increase the probability that an amount of defocus for a region for which a subject image is located at the close-up position among a plurality of regions in an area will be used, thereby achieving close-up-priority focus control. However, the method for close-up priory is not limited to the method described above, and an amount of defocus related to a defocus direction toward the close-up position with respect to an average amount of defocus may be removed from the target from which a difference of the average amount of defocus is obtained.

In the foregoing description, an averaging process has been described by way of example as a method for acquiring defocus information corresponding to an area by using a plurality of pieces of focus information output for the area. Instead of averaging, for example, certain weighting may be used to calculate an amount of defocus. In this manner, defocus information for an area is acquired using a plurality of pieces of focus information output for the area for the following reason. If an amount of defocus is selected from among respective amounts of defocus for a plurality of regions in an area, a subject image may be captured as "lines" or "points", and focus control may also be performed on differences between amounts of defocus for regions in which the subject image is captured as the "lines" or "points", which may not be suitable for Live View images or movie images. In contrast, the technical idea of averaging the amounts of defocus for the respective regions allows a subject image to be captured as a "plane", reducing problems which may be raised by the focus control based on a difference between amounts of defocus for each region in which a subject image is captured as a "line" or a "point" while, as described above by way of example, guaranteeing the accuracy of focusing on an image of the user-intended subject. In addition, similar advantages may be achieved by acquiring defocus information for an area by using a plurality of pieces of focus information output using a weighting process rather than an averaging process.

As described above, averaging a plurality of amounts of defocus in an area for a subject image to be captured as a single object may prevent or reduce variations in the amount of defocus for each region in the area, and may achieve stable focus control.

Other Embodiments

While an embodiment of the present invention has been described in detail, the present invention is not limited to the specific embodiment described above, and various embodiments within the scope of the invention are also encompassed by the present invention. Some features of the embodiment described above may be used in combination as appropriate.

A program of software that implements the functions of the embodiment described above may be supplied to a system, an apparatus, or a device having a computer configured to execute a program directly from a recording medium or via wired/wireless communication, and may be executed. The execution of the program also falls within the scope of the present invention.

Accordingly, program code that is supplied and installed to the computer to implement the functions and processes of the present invention on a computer also constitutes an embodiment of the present invention. In other words, a computer program for implementing the functions and processes of the present invention also falls within the scope of the present invention.

In this case, any form of the program, such as an object code, an interpreter-implementable program, or script data supplied to an operating system (OS), may be used as long as the functions of the program are provided.

Examples of recording media for supplying the program may include a magnetic recording medium such as a hard disk and a magnetic tape, an optical/magneto-optical storage medium, and a non-volatile semiconductor memory.

The program may be supplied in the following way. A computer program constituting an embodiment of the present invention may be stored in a server on a computer network, and a client computer that accesses the server may download the computer program and execute the computer program.

While the present invention has been described with reference to certain embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2013-228319, filed Nov. 1, 2013 and Japanese Patent Application No. 2013-228320, filed Nov. 1, 2013, which are hereby incorporated by reference herein in their entirety.

What is claimed is:

1. A focus control apparatus for detecting a phase difference between two images to acquire defocus information, comprising at least one processor or one circuitry which functions as:

an acquiring unit which acquires first defocus information by detecting a phase difference between two images in a first direction based on an output of an image sensor corresponding to a first region in an area of a captured image, and acquires second defocus information by detecting a phase difference between two images in the first direction based on an output of the image sensor corresponding to a second region in the area; and a control unit which obtains defocus information corresponding to the area using both the first defocus information acquired based on the output of the image sensor corresponding to the first region and the second defocus information acquired based on the output of the image sensor corresponding to the second region, and performs focus control based on the obtained defocus information, wherein the first region has a length longer than the length of the second region in the first direction.

2. The focus control apparatus according to claim 1, wherein the area includes a plurality of first regions and a plurality of second regions and the number of second regions is larger than the number of first regions included in the area.

3. The focus control apparatus according to claim 1, wherein the area includes a plurality of regions, and the plurality of regions included in the area include the largest number of shortest regions.

4. The focus control apparatus according to claim 1, wherein the first region is located outside of the second region in the area.

5. The focus control apparatus according to claim 1, wherein the control unit is configured to move the area in the captured image.

6. The focus control apparatus according to claim 1, wherein the control unit is configured to change the size of the area in the captured image.

7. The focus control apparatus according to claim 6, wherein the control unit is configured to reduce the size of the area after focus is achieved.

8. The focus control apparatus according to claim 6, wherein the control unit is configured to switch the size of the area before search driving is performed.

9. The focus control apparatus according to claim 6, wherein the control unit is configured to change the size of the area so that a small area is obtained during search driving.

10. The focus control apparatus according to claim 6, wherein the length of the first region and the length of the second region change in accordance with a change in the size of the area.

11. The focus control apparatus according to claim 1, wherein the defocus information is output after weighting is assigned to the defocus information so that weighting assigned to near-side focus information is greater than weighting assigned to far-side focus information.

12. The focus control apparatus according to claim 1, wherein a pair of images is output from a position on the image sensor corresponding to each of the first region and the second region, and each of the first defocus information and the second defocus information is based on a phase difference between the pair of images.

13. The focus control apparatus according to claim 12, wherein the phase-difference detection direction in which the length of the first region and the length of the second region lie is a direction in which the phase difference is detected.

14. The focus control apparatus according to claim 12, wherein each of the first defocus information and the second defocus information is information on a correlation between two images.

15. The focus control apparatus according to claim 1, further comprising the image sensor,
    the image sensor including
       a plurality of micro lenses, and
       a plurality of light receiving units for each of the plurality of micro lenses.

16. The focus control apparatus according to claim 1, further comprising the image sensor,
    the image sensor including
       a plurality of micro lenses, and
       pixel units each having light receiving units having different opening positions for each of the plurality of micro lenses.

17. The focus control apparatus according to claim 1, wherein the control unit is configured to acquire defocus information corresponding to the area using an average value of a plurality of pieces of defocus information output for the first region and the second region.

18. The focus control apparatus according to claim 1, wherein the control unit is configured to assign a small weighting to a piece of defocus information, among the first defocus information and the second defocus information, with a large difference to an average value of the first defocus information and the second defocus information, and to obtain defocus information corresponding to the area.

19. The focus control apparatus according to claim 1, wherein the control unit is configured to obtain the one defocus information corresponding to the one area using both the first defocus information and the second defocus information.

20. The focus control apparatus according to claim 1, wherein a longitudinal direction of the first region is parallel to a longitudinal direction of the second region.

21. A control method for a focus control apparatus, comprising:
    acquiring first focus information by detecting a phase difference between two images in a first direction based on an output of an image sensor corresponding to a first region of a captured image;
    acquiring second focus information by detecting a phase difference between two images in the first direction based on an output of the image sensor corresponding to a second region of the captured image,
    the first region and the second region being located in an area of the captured image; and
    a control step of obtaining defocus information corresponding to the area using both the first defocus information acquired based on the output of the image sensor corresponding to the first region and the second defocus information acquired based on the output of the image sensor corresponding to the second region, and performing focus control based on the obtained defocus information,
    wherein the first region in the area has a length longer than a length of the second region in the first direction.

22. A focus control apparatus comprising at least one processor or one circuitry which functions as:
    an output unit which outputs a plurality of pieces of defocus information each corresponding to one of a plurality of regions located in an area in a captured image; and
    a control unit which obtains defocus information corresponding to the area using the output plurality of pieces of defocus information and weightings assigned to each of the output plurality of pieces of defocus information, and performs focus control based on the obtained defocus information,
    wherein the output plurality of pieces of defocus information includes at least first defocus information and second defocus information which has a smaller difference from an average value of the output plurality of pieces of defocus information than a difference between the first defocus information and the average value of the output plurality of pieces of defocus information, and
    wherein the control unit is configured to assign a smaller weighting to the first defocus information than a weighting to the second defocus information, and to output the defocus information.

23. The focus control apparatus according to claim 22, wherein each of the plurality of regions includes a number of regions having different lengths, and
    wherein a number of short regions among the plurality of regions is larger than a number of long regions among the plurality of regions.

* * * * *